(12) United States Patent
Christiansen et al.

(10) Patent No.: US 10,223,378 B2
(45) Date of Patent: Mar. 5, 2019

(54) CONTROLLING REPARSE BEHAVIOR ASSOCIATED WITH AN INTERMEDIATE DIRECTORY

(71) Applicant: Microsoft Technology Licensing, LLC, Redmond, WA (US)

(72) Inventors: Neal R. Christiansen, Bellevue, WA (US); Scott Brender, Kirkland, WA (US); Sarosh Havewala, Redmond, WA (US); Craig Barkhouse, Duvall, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 288 days.

(21) Appl. No.: 15/236,236

(22) Filed: Aug. 12, 2016

(65) Prior Publication Data

US 2017/0124113 A1 May 4, 2017

Related U.S. Application Data

(60) Provisional application No. 62/249,875, filed on Nov. 2, 2015.

(51) Int. Cl.
*G06F 17/30* (2006.01)
*G06F 9/455* (2018.01)

(52) U.S. Cl.
CPC ........ *G06F 17/30221* (2013.01); *G06F 9/455* (2013.01); *G06F 17/30067* (2013.01); *G06F 17/30144* (2013.01); *G06F 17/30235* (2013.01)

(58) Field of Classification Search
CPC .................. G06F 17/30144; G06F 17/30221
See application file for complete search history.

(56) References Cited

U.S. PATENT DOCUMENTS 5,012,405 A 4/1991 Nishikado et al.
5,931,935 A 8/1999 Cabrera et al.
(Continued)

FOREIGN PATENT DOCUMENTS

EP 1008045 A1 6/2000

OTHER PUBLICATIONS

"NtCreateFile function", Published on: Oct. 2, 2010 Available at: <https://msdn.microsoft.com/en-us/library/bb432380(v=vs.85).aspx>, 11 pages.
(Continued)

*Primary Examiner* — Kris E Mackes
(74) *Attorney, Agent, or Firm* — Jacob P. Rohwer; Newport IP, LLC (57) ABSTRACT

The techniques and systems described herein determine whether or not to implement reparse behavior in association with a file or a directory access. A file system and/or a file system filter can receive, from a host system component, a request to open a file or a directory. While attempting to access the file or the directory, a reparse tag associated with an intermediate directory is encountered. The file system can then determine whether a next node, along an access path for the file or the directory to be opened, exists in the intermediate directory. That is, the file system can look beyond the reparse tag and into the intermediate directory to determine if the next node exists. Subsequently, the file system and/or the file system filter can decide whether to implement reparse behavior based on the reparse tag and whether the next node exists in the intermediate directory.

20 Claims, 5 Drawing Sheets

(56) References Cited

U.S. PATENT DOCUMENTS

| | | | |
|---|---|---|---|
| 7,502,832 | B2 | 3/2009 | San Andres et al. |
| 8,112,464 | B2 | 2/2012 | Young et al. |
| 8,321,482 | B2 | 11/2012 | Young et al. |
| 8,412,896 | B1 | 4/2013 | Chellappa et al. |
| 9,223,797 | B2 | 12/2015 | Wang et al. |
| 2007/0198458 | A1* | 8/2007 | Pudipeddi ......... G06F 17/30067 |
| 2009/0106780 | A1* | 4/2009 | Nord ..................... G06F 8/60 |
| | | | 719/329 |
| 2009/0132616 | A1* | 5/2009 | Winter ............... G06F 11/1451 |
| 2009/0271442 | A1 | 10/2009 | Young et al. |
| 2010/0114977 | A1 | 3/2010 | Bacher et al. |
| 2011/0197184 | A1 | 8/2011 | Sheehan |
| 2015/0067005 | A1 | 3/2015 | Avati |

OTHER PUBLICATIONS

Pyle, Ned, "Server Storage at Microsoft", Published on: Feb. 14, 2013 Available at: <https://blogs.technet.microsoft.com/filecab/2013/02/14/dfsr-reparse-point-support-or-avoiding-schrdingers-file/>, 13 pages.

"International Search Report and Written Opinion Issued in PCT Application No. PCT/US2016/058611", dated Feb. 23, 2017, 13 Pages.

"Second Written Opinion Issued in PCT Application No. PCT/US2016/058611", dated Oct. 25, 2017, 8 Pages.

\* cited by examiner

CONTROLLING REPARSE BEHAVIOR ASSOCIATED WITH AN INTERMEDIATE DIRECTORY

PRIORITY APPLICATION

This application claims the benefit of and priority to U.S. Provisional Application No. 62/249,875, filed Nov. 2, 2015, the entire contents of which are incorporated herein by reference.

BACKGROUND

A host entity is able to access stored files via a file system. Reparse behavior has typically only been implemented in association with an "end-point" of a file system. That is, in response to receiving an open file instruction, a file system navigates through the nodes in a file system hierarchy to open the file, and upon encountering a reparse tag associated with a node, the file system automatically implements reparse behavior without looking beyond the node associated with the reparse tag. Accordingly, if the node that is associated with the reparse tag encountered by the file system is a directory, the file system is unable to view into the directory to determine if the directory contains the file to be opened or another directory. Thus, a conventional file system has previously considered a directory associated with the reparse tag as an "end-point" because the conventional file system stops its navigation of the file system hierarchy based on the reparse tag and automatically implements reparse behavior, even though the directory may not actually be an end-point in that the directory contains additional nodes (e.g., the directory contains files and/or the directory is a parent directory that contains one or more child directories).

SUMMARY

The techniques and systems described herein determine whether or not to implement reparse behavior in association with a file or directory access. A file system and/or a file system filter can receive, from a host system component, a request to open a file or a directory. While accessing the file or the directory to be opened, a reparse tag associated with an intermediate directory is encountered. The directory can be considered an "intermediate" directory if it is a node along an access path that is navigated and that leads to the final node on the access path (e.g., a file or a directory to be opened). Upon encountering the reparse tag, the file system can determine whether a next node on the access path exists in the intermediate directory associated with the reparse tag. That is, the file system can look beyond the reparse tag and into the intermediate directory to determine if the next node exists. Subsequently, the file system and/or the file system filter can decide whether to implement reparse behavior based on the reparse tag and whether the next node exists in the intermediate directory.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, can refer to system(s), method(s), computer-readable instructions, engine(s), module(s), algorithms, hardware logic, and/or operation as permitted by the context described above and throughout the document.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical components.

DETAILED DESCRIPTION

The techniques and systems described herein control reparse behavior associated with an intermediate directory in a file system. A file system comprises a hierarchy of discrete objects, wherein a position of each object in the file system hierarchy can be referred to as a node. For instance, an object within a file system hierarchy can comprise a directory or a file. Reparse behavior can be implemented in association with a reparse point. The reparse point enables a file system to be extended. For example, a reparse point can contain a reparse tag that identifies reparse data useable by a file system filter to redirect an access from a first directory (e.g., located in a first file system) to a second directory (e.g., located in the second file system). Example types of reparse points include: a symbolic link, a junction point, and/or a volume mount point.

As described above, reparse behavior has typically only been able to be implemented in association with an "end-point" of a file system. That is, in response to receiving an open file instruction, a file system navigates through the nodes in a file system hierarchy to open the file, and upon encountering a reparse tag associated with a node, the file system considers the node an end-point and automatically implements reparse behavior (e.g., attempts to find a file system filter that owns the reparse tag so the file system filter can redirect a file access) without looking beyond the node associated with the reparse tag. Accordingly, if the node that is associated with the reparse tag encountered by the file system is a directory, the file system is unable to view into the directory to determine if the directory contains the file to be opened or if the directory contains another directory along the access path designated by an open request, The techniques and systems described herein enable a file system filter and/or a file system to control whether or not to implement reparse behavior at an intermediate directory based on a determination of whether or not a next node exists in the intermediate directory. Accordingly, the file system filter and/or the file system. are configured to look beyond, or into, an intermediate directory that is associated with a reparse point. Moreover, the techniques and systems described herein enable a file system filter and/or a file system to partially expand the files and/or directories contained in the intermediate directory associated with the reparse point (e.g., partially expand the intermediate directory with some of its contents while still enabling reparse behavior for other contents that have not yet been expanded).

Figure 1:
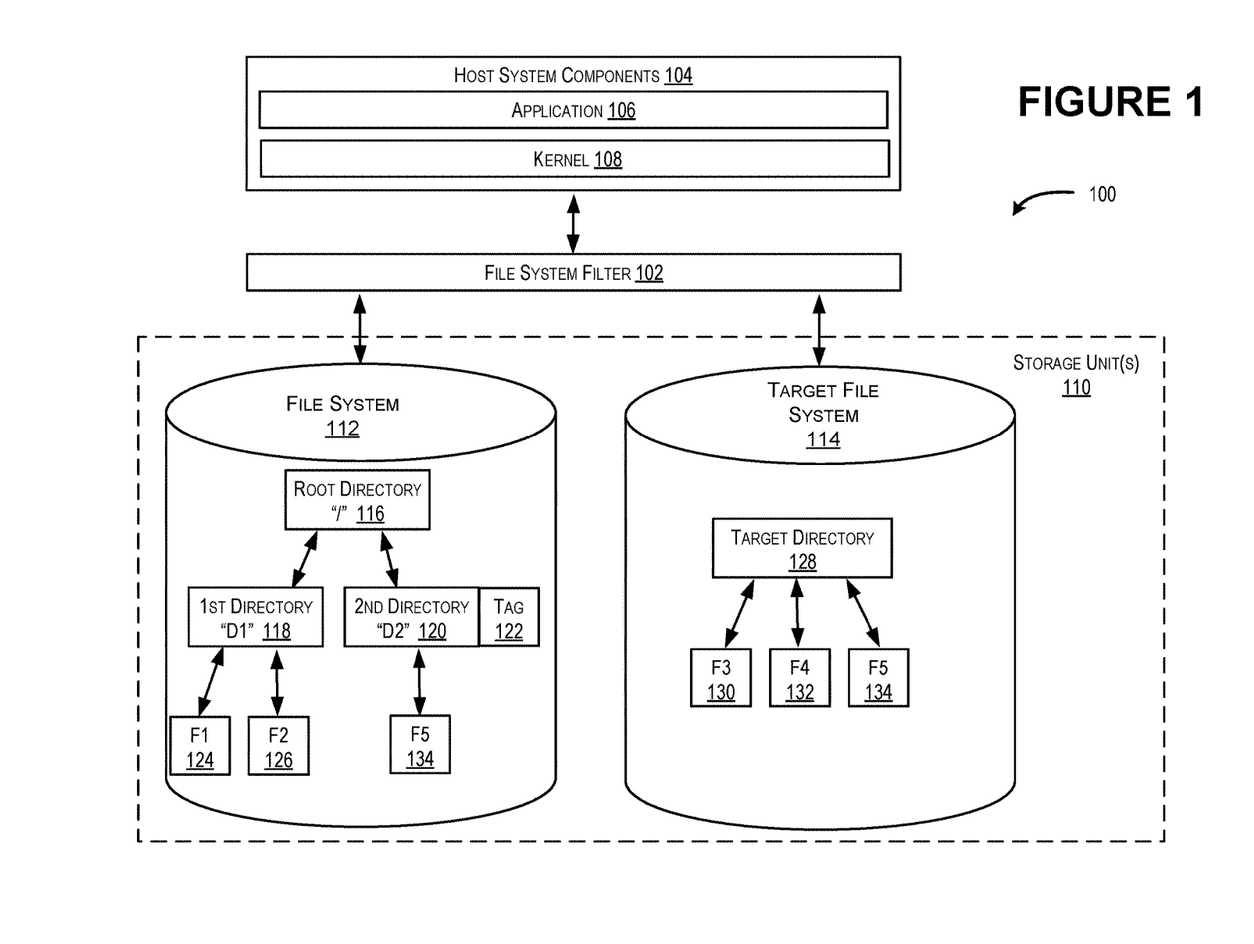
FIG. 1 is a block diagram depicting an example environment in which a decision can be made to perform reparse behavior at an intermediate node.

FIG. 1 is a block diagram depicting an example environment 100 in which a decision can be made to perform reparse behavior at an intermediate node (e.g., an intermediate directory). For instance, FIG. 1 illustrates a file system filter 102 that can be configured to control whether or not reparse behavior is to be implemented in association with an intermediate directory of a file system. In various examples, the file system filter 102 can be configured between host system components 104, such as an application 106 and/or a kernel 108, and various file systems (e.g., namespaces, container namespaces, etc.) persistently stored on storage unit(s) 110. Accordingly, FIG. 1 illustrates file system 112 and target file system 114 to which the file system filter 102 can redirect a file or a directory access, as further described herein. While FIG. 1 illustrates redirecting a file or a directory access from one file system to another, it is understood in the context of this document that a file or a directory access can be redirected from one directory to another directory within the same file system. Examples of a storage unit 110 include: a machine (e.g., a server), a disk, a platter, a sector, and so forth. In some instances, storage units can be arranged into a "rack" (e.g., a row) and multiple racks of storage units can be arranged into a "grid" of storage units (e.g., configured within a data center).

For illustration purposes, file system 112 includes a root directory "/" 116, a first intermediate directory "D1" 118, and a second intermediate directory "D2" 120 that has an associated reparse tag 122. The first intermediate directory "D1" 118 contains a first file "F1" 124 and a second file "F2" 126, and since there is no reparse tag associated with the first intermediate directory "D1" 118, the file system 112 is configured to open the first file "F1" 124 and/or the second file "F2" 126 so that a host system component 104 can read actual file data from the first file "F1" 124 and/or the second file "F2" 126.

In contrast with the first intermediate directory "D1" 118, the second intermediate directory "D2" includes the reparse tag 122. In various examples, the reparse tag 122 comprises metadata that identifies the file system filter 102 and that has the ability to cause the file system filter 102 to redirect a file or a directory access from the second intermediate directory "D2" 120 to a target directory 128 (e.g., located in target file system 114). Target directory 12.8 contains a third file "F3" 130, a fourth file "F4" 132, and a fifth file "F5" 134. If a host system component 104 requests that the third file "F3" 130 or the fourth file "F4" 132 be opened from the file system 112, the file system 112 encounters the reparse tag 122 which can be owned by the file system filter 102 and, subsequently, upon encountering the reparse tag 12, the file system 112 acts under control of the file system filter 102.

However, rather than automatically implementing reparse behavior based on the reparse tag 122, the file system 112 is configured and/or enabled to view into the second intermediate directory "D2" 120 to determine if the next node (e.g., a file to be accessed or another directory along the access path) exists in the file system 12 before the access is redirected to the target directory 128 of the target file system 114. For example, if a host system component 104 requests to access the fifth file "F5" 134 from file system 112 and the second intermediate directory "D2" 120 includes a copy of the fifth file "F5" 134, as illustrated in FIG. 1, then the file system 112 can be configured to view into the second intermediate directory "D2" 120 to determine if the file exists without automatically implementing reparse behavior based on the reparse tag 122 associated with the second intermediate directory "D2" 120 (e.g., a parent "directory" node of the child "file" node being accessed via a designated access path).

As described above, upon encountering a reparse tag associated with a node, the file system would typically implement automatic reparse behavior without further looking into the content of the node. However, the file system filter 102 in FIG. 1, via the use of reparse tag 122, can be configured to control whether or not reparse behavior is to be implemented in association with an intermediate directory based on the contents contained in the intermediate directory.

In various implementations, the file system filter 102 and/or the file system 112 can control, for an individual file open request (e.g., received from an application), whether to invoke reparse behavior in association with encountering a reparse tag on an intermediate directory, as described herein with respect to the following four (4) examples. The decision on whether to invoke reparse behavior can be made after the file system 112 and/or the file system filter 102 views into the intermediate directory to determine whether a next node to be accessed exists therein (e.g., the file system 112 and/or the file system filter 102 looks beyond the reparse tag).

In a first example, the file system filter 102 can instruct the file system 112 to not implement reparse behavior if the next node to be accessed exists in an intermediate directory associated with a reparse tag (e.g., file "F5" 134 in the second intermediate directory "D2" 120). That is, the file system filter 102 can make the decision to not implement reparse behavior if the next node to be accessed is contained in the intermediate directory. Therefore, in the example of FIG. 1, the file system 112 proceeds to open the next node (e.g., file "F5" 134) via the file system 112 and/or the intermediate directory (e.g., the second intermediate directory "D2" 120).

In a second example, the file system filter 102 can instruct the file system 112 to implement reparse behavior even if the next node to be accessed exists in the intermediate directory associated with a reparse tag (e.g., file "F5" 134 in the second intermediate directory "D2" 120). That is, the file system filter 102 can make the decision to implement reparse behavior even if the next node to be accessed is contained in the intermediate directory. Therefore, in the example of FIG. 1, the file system filter 102 causes the next node (e.g., file "F5" 134) to be opened via a redirection to a different file system (e.g., the target file system 114) and/or a different directory (e.g., the target directory 128).

In a third example, the file system filter 102 can instruct the file system 112 to not implement reparse behavior if the next node to be accessed does not exist in the intermediate directory associated with a reparse tag (e.g., file "F3" 130 or file "F4" 132 does not exist in the second intermediate directory "D2" 120). Therefore, in this third example, the open request fails and/or an error occurs because the file system 112 is unable to open the next node to be accessed via the intermediate directory designated in a file access path (e.g., the second intermediate directory "D2" 120), and no reparse behavior is implemented.

In a fourth example, the file system filter 102 can instruct the file system 112 to implement reparse behavior if the next node to be accessed does not exist in the intermediate directory associated with a reparse tag (e.g., file "F3" 130 or file "F4" 132 does not exist in the second intermediate directory "D2" 120), Therefore, the file system filter 102 causes the next node (e.g., file "F3" 130 or file "F4" 132) to be opened via a redirection to a different file system (e.g., the target file system 114) and/or a different directory (e.g., the target directory 128).

Consequently, as described in the examples above, the file system filter 102 can control and/or decide, for an individual file or directory open request, whether or not to implement reparse behavior in association with a reparse tag that is owned by the file system filter 102. In some instances, the file system filter 102 makes the decision based on a type of reparse point, including, for example: a symbolic link, a junction point, or a volume mount point.

In alternative implementations, the reparse behavior can be controlled by, or implemented in association with, default settings and independent of a file system filter 102. That is, the file system 112, without the use of a file system filter 102, can decide whether or not to invoke reparse behavior when a reparse tag is encountered. Consequently, in these alternative implementations, the file system filter 102 in FIG. 1 may neither be present nor accessible, and the file system 112 itself can follow previously defined default settings when a reparse tag is encountered on an intermediate directory. For instance, similar to the examples provided above, a first default setting can cause the file system 112 to not implement reparse behavior if the next node to be accessed exists in an intermediate directory associated with a reparse tag file "F5" 134 in the second intermediate directory "D2" 120). A second default setting can cause the file system 112 to implement reparse behavior even if the next node to be accessed exists in the intermediate directory associated with a reparse tag (e.g., file "F5" 134 in the second intermediate directory "D2" 120). A third default setting can cause the next node system 112 to not implement reparse behavior if the next node to be accessed does not exist in the intermediate directory associated with a reparse to (e.g., file "F3" 130 or file "F4" 132 does not exist in the second intermediate directory "D2" 120). And a fourth default setting can cause the file system to implement reparse behavior if the next node to be accessed does not exist in the intermediate directory associated with a reparse tag (e.g., file "F3" 130 or file "F4" 132 does not exist in the second intermediate directory "D2" 120). In some instances, a default setting can depend on a type of reparse point, including, for example: a symbolic link, a junction point, or a volume mount point.

The techniques and systems described herein further allow for partial expansion of an intermediate directory configured as a reparse point. For instance, an intermediate directory (e.g., the second intermediate directory "D2" 120) can be partially or gradually expanded with individual objects (e.g., a file or a directory) because the reparse tag 122 enables (i) some node accesses to be implemented via file system 112 (e.g., files or directories that exist in the second intermediate directory "D2" 120 such as the fifth file "F5" 134) and (ii) some node accesses to be redirected to a different file system or a different directory (e.g., files or directories that do not exist in the second intermediate directory "D2" 120 such as the third file "F3" 130 or the fourth file "F4" 132 in target file system 114 and/or a target file directory 128). In conventional systems, to have a capability to look into an intermediate directory associated with a reparse tag, a file system filter and/or a file system would be required to fully expand the intermediate directory by removing its reparse tag and then populating the intermediate directory with all of its contents (e.g., directories and/or files) so that the reparse behavior is no longer implemented.

Accordingly, such conventional systems do not allow for partial or gradual expansion of nodes contained in an intermediate directory associated with a reparse tag. However, by using the reparse tag 122, the file system filter 102 and/or the file system 112 enables the second intermediate directory "D2" to be partially expanded with some of its contents (e.g., the fifth file "F5" 134) but not all of its contents. For example, accesses to the third file "F3" 130 or the fourth file "F4" 132 can still be redirected (e.g., under control of the file system filter 102) from the file system 112 to the target file system 114 after the file system 112 looks into the second intermediate directory "D2" and determines that neither the third file "F3" 130 nor the fourth file "F4" 132 exists.

Consequently, the file system filter 102 and/or the file system 112 are configured to control, for an individual file or directory open request, whether or not reparse behavior is to be implemented when a reparse tag 122 is encountered (e.g., based on whether the next node exists).

Figure 2:
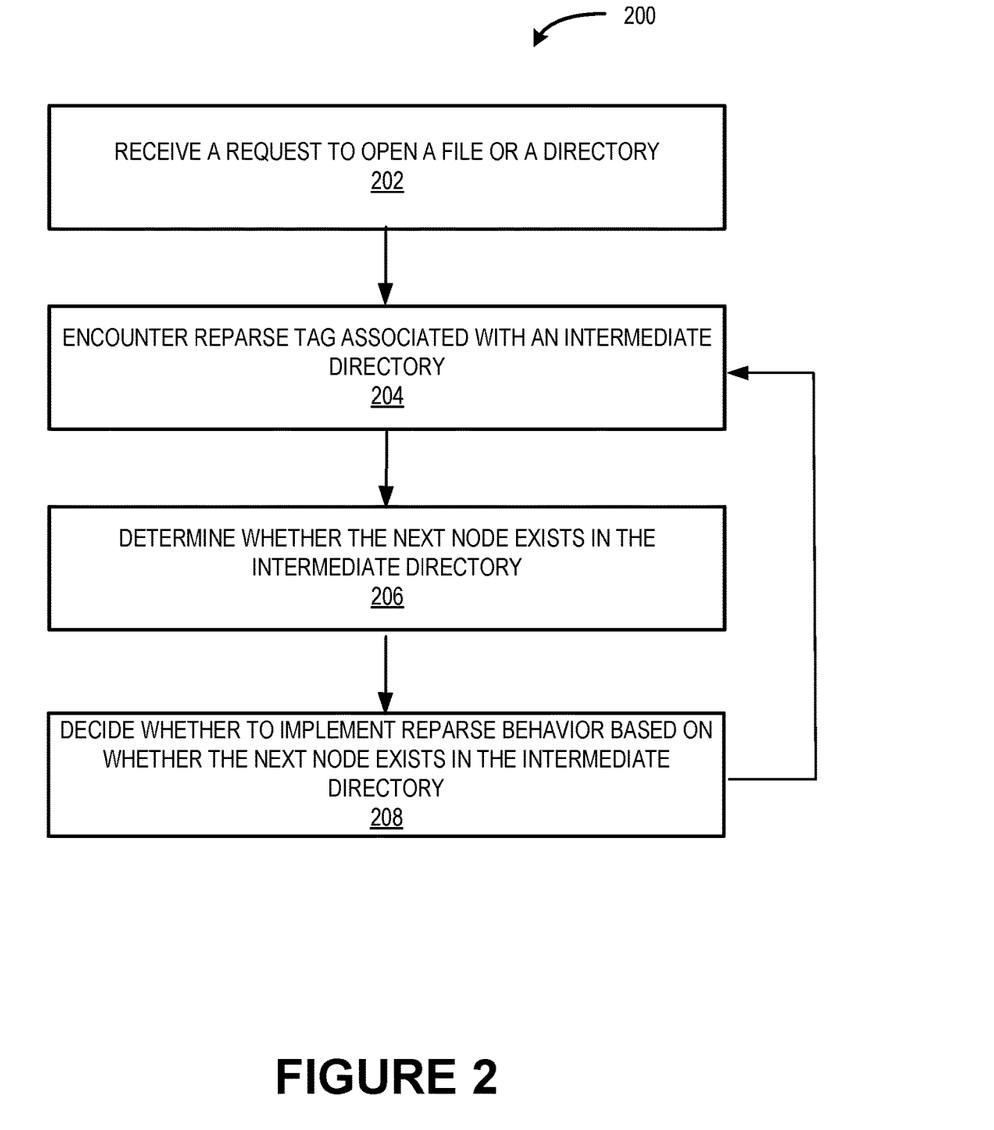
FIG. 2 illustrates a flow diagram of an example process that decides whether or not to implement reparse behavior in association with a file or a directory access.
Figure 3:
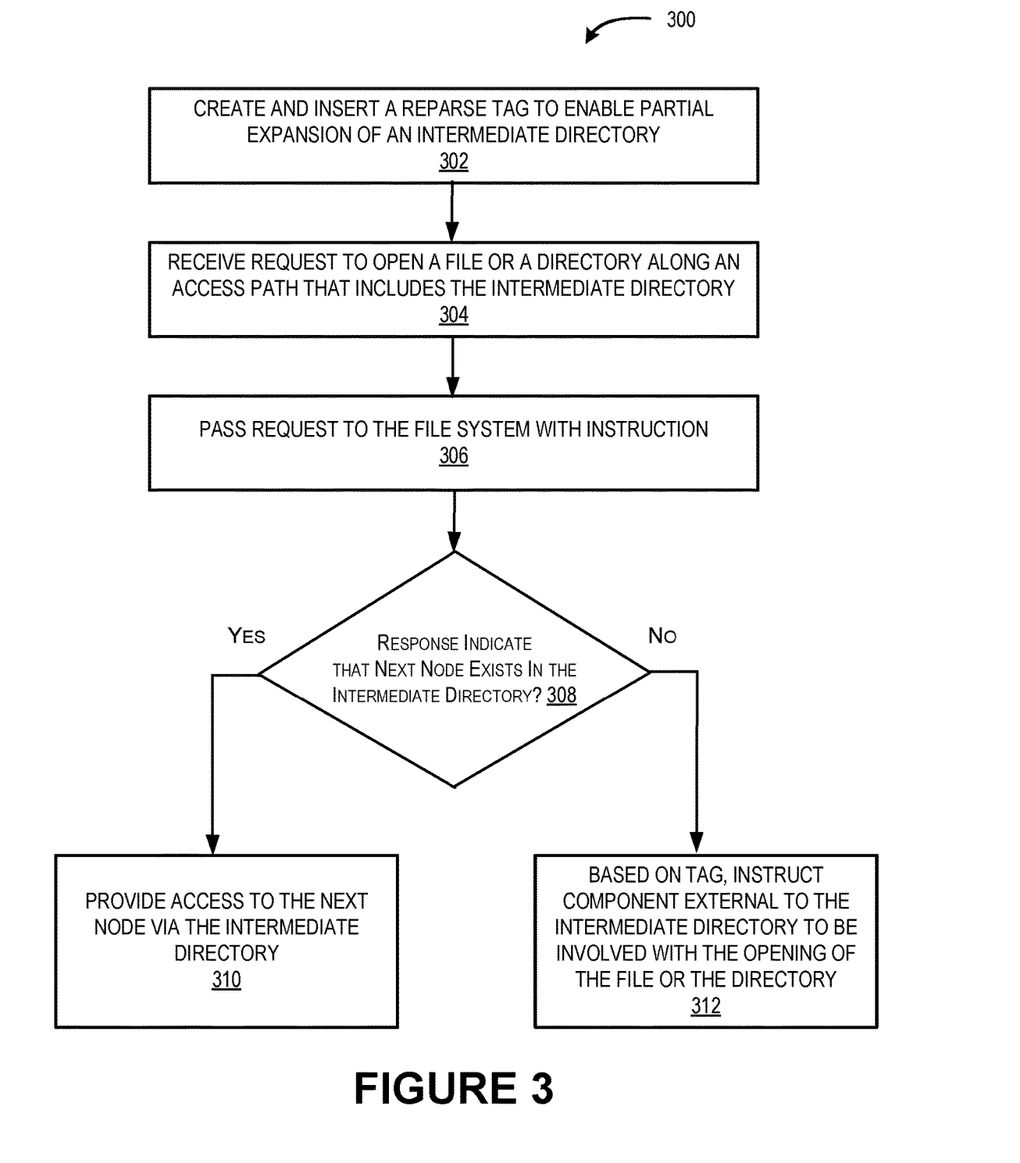
FIG. 3 illustrates a flow diagram of an example process that controls whether or not to implement reparse behavior in association with a file or a directory access (e.g., an open file request handled by a file system filter).
Figure 4:
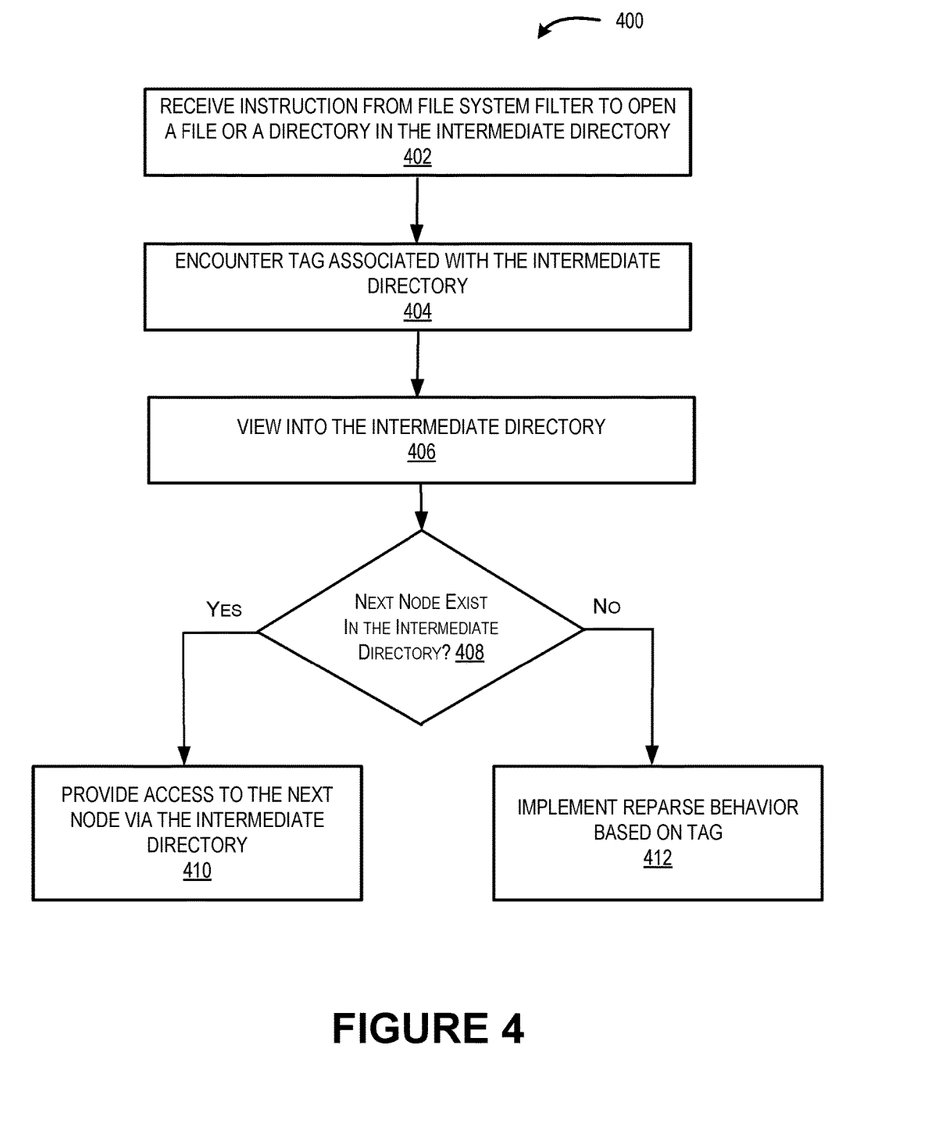
FIG. 4 illustrates a flow diagram of an example process that determines, using a reparse tag, whether or not to implement reparse behavior in association with a. file or a directory access.

FIGS. 2-4 illustrate example processes for employing the techniques described herein. The example processes are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, configure a device to perform the recited operations. Generally, computer-executable instructions include routines, programs, objects, components, data structures, and the like that perform particular functions. The order in which the operations are described is not intended to be construed as a limitation, and any number of the described operations can be combined in any order and/or in parallel to implement the process. Further, any of the individual operations can be omitted.

FIG. 2 illustrates a flow diagram of an example process 200 that decides whether or not to implement reparse behavior in association with a file or a directory access (e.g., an open file request). The example process 200 can be implemented in association with the components illustrated in FIG. 1 (e.g., by the file system filter 102 and/or the file system 112).

At 202, a request to open a file or a directory is received from a host system component. For example, an application 106 can request that the file system 112 access one of file "F3" 130, file "F4" 132, or file "F5" 134.

At 204, one or more nodes designated in an access path associated with the request is/are navigated until a reparse tag associated with a node is encountered. For example, the reparse tag (e.g., reparse tag 122) can be associated with an intermediate directory included in a file system path to access a file (e.g., the second intermediate directory "D2" 120).

At 206, it is determined whether the next node (e.g., the node along the access path that is after the node associated with the reparse tag) to be accessed exists in the intermediate directory. For example, the file system 12 can look beyond the reparse tag 122 and into the second intermediate directory "D2" 120 to determine if the next node (e.g., a file) exists.

At 208, it is decided whether to implement reparse behavior based on the reparse tag and whether the next node exists in the intermediate directory (as determined in operation 206). In various implementations described above, the file system filter 102 can decide whether or not to implement the reparse behavior. In alternative implementations, the file system 112 can be configured to implement a default action with respect to reparse behavior on its own and without a file system filter 102 (in accordance with a default setting).

In some instances, after the decision is made, the process can return to operation 204 where another reparse tag associated with another node along the access path is encountered. Accordingly, operations 206 and 208 can be repeated.

FIG. 3 illustrates a flow diagram of an example process 300 that controls whether or not to implement reparse behavior in association with a file or a directory access (e.g., an open file request). The example process 300 can be implemented in association with the components illustrated in FIG. 1 (e.g., by the file system filter 102).

At 302, a reparse tag is created and inserted into a file system to enable partial expansion of an intermediate directory. For example, the file system filter 102 can create a reparse tag 122 (e.g., the file system filter owns the reparse tag) and assign the reparse tag to the second intermediate directory "D2" 120 in the file system 112.

At 304, a request to open a file or a directory along an access path that includes the intermediate directory is received from a host system component. For example, an application 106 can request that the file system 112 access one of file "F3" 130 (e.g., via access path "/"→"D2"→"F3"), file "F4" 132 (e.g., via access path "/"→"D2"→"F4"), or file "F5" 134 (e.g., via access path "/"→"D2"→"F5").

At 306, the request is passed to the file system with an instruction. For example, the file system filter 102 can instruct the file system 112 to access a next node from the intermediate directory (e.g., the second intermediate directory "D2" 120) if the next node exists in the intermediate directory (e.g., the intermediate directory is partially expanded with the next node).

At 308, it is determined whether a response from the file system indicates that the file system is able to access the next node via the intermediate directory.

If "Yes" at 308, then at 310, the file system filter assists in accessing the next node and/or providing access to the file or the directory to be opened via the intermediate directory. For example, file "F5" 134 can be opened via the second intermediate directory "D2" 120.

If "No" at 308, then at 312, the file system filter instructs, based on a reparse tag associated with the intermediate directory, a component external to the intermediate directory (e.g., the target file system 114 and/or the target directory 128) to be involved with the opening of the file or the directory (e.g., the file system filter 102 redirects the file access). For example, file "F3" 130 or file "F4" 132 can be opened via a redirection to target file system 114 and/or to target directory 128.

FIG. 4 illustrates a flow diagram of an example process 400 that determines, using a reparse tag, whether or not to implement reparse behavior in association with a file or a directory access. The example process 400 can be implemented in association with the components illustrated in FIG. 1 (e.g., by the file system 112).

At 402, an instruction is received from a file system filter to open a file or a directory in an intermediate directory. The instruction can also indicate that the file or the directory is to be opened in the intermediate directory if the file or the directory exists in the intermediate directory.

At 404, a reparse tag associated with the intermediate directory is encountered. For example, while using an access path to access the file or be directory to be opened, the file system 112 may encounter reparse tag 122.

At 406, rather than implementing automatic reparse behavior, the file system, based on the instruction from the file system filter, views into the intermediate directory. As described above, the second intermediate directory "D2" 120 can be partially expanded such that some files and/or directories exist therein (e.g., file "F5" 134), yet e files and/or directories do not exist therein (e.g., file "F3" 130 and file "F4" 132).

At 408, it is determined whether or not the next node along the access path exists in the intermediate directory.

If "Yes" at 408, then at 410, the file system provides access to the next node via the intermediate directory. For example, file "F5" 134 can be opened via the second intermediate directory "D2" 120.

If "No" at 408, then at 412, the file system implements reparse behavior based on the reparse tag (e.g., informs the file system filter 102 that access to the next node is to be redirected). For example, file "F3" 130 or file "F4" 132 can be opened via a redirection to target file system 114 and/or to target directory 128.

Accordingly, as described above in various examples, the file system can determine whether to implement reparse behavior when a reparse point is encountered on an intermediate directory without the file system filter (e.g., not under control of a file system filter). Rather, the file system can determine whether to implement reparse behavior in accordance with a default behavior defined for the file system. For example, the file system, by default, may not invoke any kind of reparse behavior when a reparse point is encountered, whether the next node exists in the intermediate directory or not. Consequently, the file system can access the next node if it exists in the intermediate directory, but fails to access the next node if it does not exist in the intermediate directory. In some instances, the file system can own the reparse tag.

In various examples, a file system filter can be configured to copy a node to an intermediate directory associated with a reparse tag. For instance, a file system and a file system filter can implement reparse behavior when a node to be accessed does not exist in the intermediate directory. However, rather than providing access to the node via redirection (e.g., via target directory 128 instead of the second intermediate directory "D2" 120), the file system filter can copy the node from an external location to the intermediate directory (e.g., the file system filter can populate the second intermediate directory "D2" 120 with a copy of the file "F5" 134 so the file can be accessed via the second intermediate directory "D2" 120 instead of the target directory 128).

Figure 5:
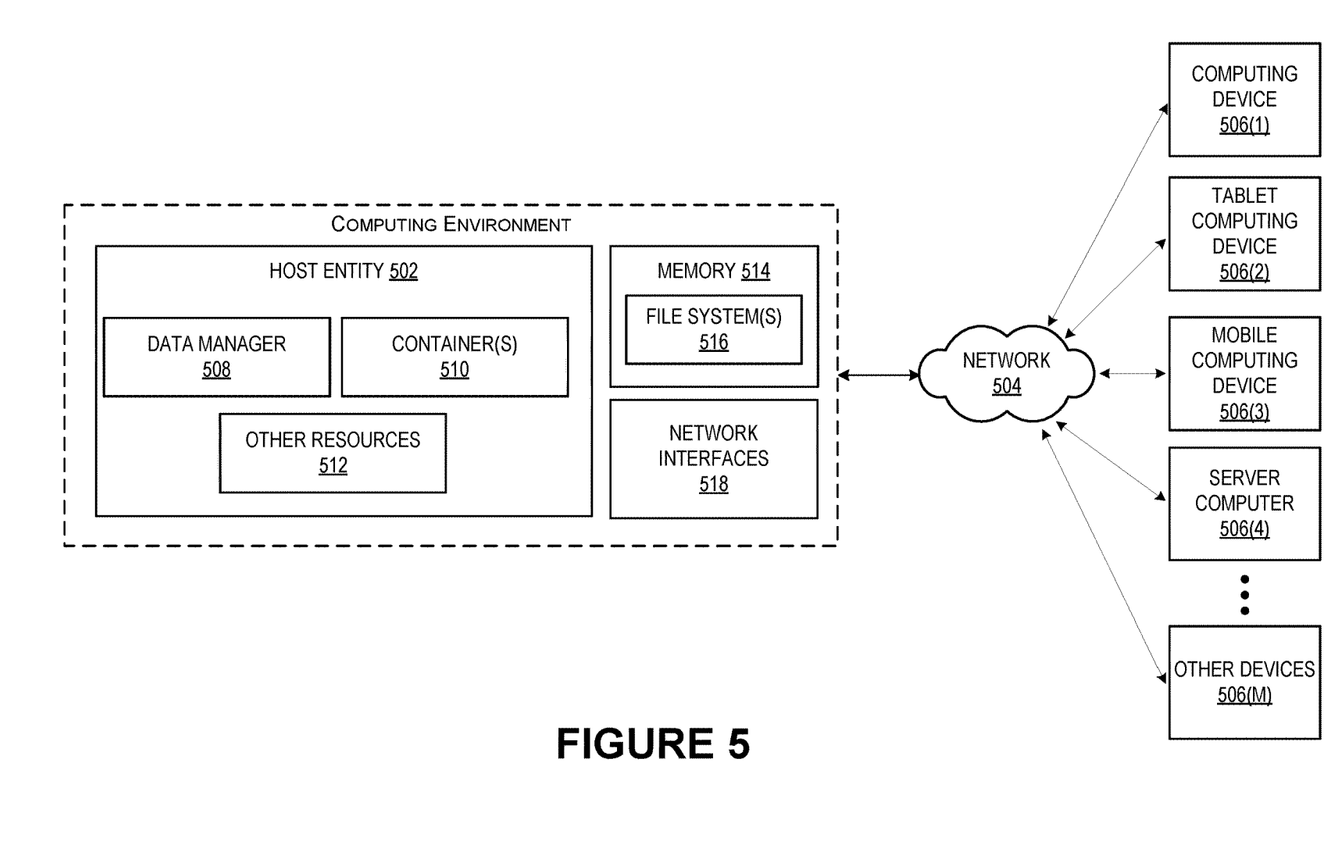
FIG. 5 illustrates a block diagram depicting an example computing environment capable of executing the techniques and systems described herein.

FIG. 5 illustrates an example computing environment capable of executing the techniques and systems described above with respect to FIGS. 1-4. In various examples, the computing environment includes a host entity 502 operating on, in communication with, or as part of a network 504. The network 504 can be or can include various access networks. For example, one or more client devices 506(1) . . . 506(M) can communicate with the computing environment via the network 504 and/or other connections. Client devices can include, but are not limited to, any one of a variety of devices, including portable devices or stationary devices. For instance, a client device can comprise a smart phone, a mobile phone, a personal digital assistant (PDA), an electronic book device, a laptop computer, a desktop computer, a tablet computer, a portable computer, a gaming console, a personal media player device, a server computer or any other electronic device.

The host entity 502 can include a data manager 508, container(s) 510, and other resources 512. In various implementations, the data manager 508 may be, or may contain, the file system filter 102 described above. According to various implementations, the functionality of the host entity 502 can be provided by one or more servers that are executing as part of, or in communication with, the network 504. A server can host various services, virtual machines, portals, and/or other resources, including the container(s) 510. For example, a server, via the use of containers 510, can host or provide access to one or more portals, Web sites, and/or other information.

The computing environment can include memory 514. According to various implementations, the functionality of the memory 514 also can be provided by, or part of, one or more servers configured to host data for the computing environment (e.g., including host entity 502). The memory 514 can contain persistent memory that stores file system(s) 516 (e.g., different namespace(s)). The memory 514 can also contain cache memory as an execution area for files loaded from the file system(s) 516. In various implementations, components of the host entity 502 (e.g., the data manager 508, the container(s) 510, other resources 512, etc.) can also reside on the memory 514 or a separate memory associated with the host entity 502.

The computing environment can also include one or more processor(s). The processor(s) can be a single processing unit or a number of units, each of which could include multiple different processing units. The processor(s) can include a microprocessor, a microcomputer, a microcontroller, a digital signal processor, a central processing unit (CPU), a graphics processing unit (GPU), a security processor etc. Alternatively, or in addition, some or all of the techniques described herein can be performed, at least in part, by one or more hardware logic components. For example, and without limitation, illustrative types of hardware logic components that can be used include a Field-Programmable Gate Array (FPGA), an Application-Specific Integrated Circuit (ASIC), an Application-Specific Standard Products (ASSP), a state machine, a Complex Programmable Logic Device (CPLD), other logic circuitry, a system on chip (SoC), and/or any other devices that perform operations based on instructions. Among other capabilities, the processor(s) may be configured to fetch and execute computer-readable instructions stored in the memory 514.

The memory 514 can include one or a combination of computer-readable media. As used herein, "computer-readable media" includes computer storage media and communication media.

Computer storage media includes volatile and non-volatile, removable and non-removable media implemented in any method or technology for storage of information, such as computer-readable instructions, data structures, program modules, or other data. Computer storage media includes, but is not limited to, phase change memory (PCM), static random-access memory (SRAM), dynamic random-access memory (DRAM), other types of random access memory (RAM), read-only memory (ROM), electrically erasable programmable ROM (EEPROM), flash memory or other memory technology, compact disk ROM (CD-ROM), digital versatile disks (DVD) or other optical storage, magnetic cassettes, magnetic tape, magnetic disk storage or other magnetic storage devices, or any other medium that can be used to store information for access by a computing device.

In contrast, communication media includes computer-readable instructions, data structures, program modules, or other data in a modulated data signal, such as a carrier wave. As defined herein, computer storage media does not include communication media.

The computing environment can communicate over the network 504 via network interfaces 518. The network interfaces 518 can include various types of network hardware and software for supporting communications between two or more devices including.

In some implementations, the computing environment can operate within a network service (e.g., a cloud service, a data center, etc.). The network(s) 504 may include the Internet, a Mobile Telephone Network (MTN) or other various wired or wireless communication technologies.

EXAMPLE CLAUSES

Example Clause A, a system comprising: one or more processors; memory; a storage unit including a file system that provides access to one or more files or directories; and a file system filter stored in the memory and executable by the one or more processors to: receive a request to access a file or a directory associated with the file system, the request designating an access path for the file or the directory, the access path including multiple nodes; pass the request to access the file or the directory to the file system; receive a response from the file system, the response indicating that a reparse tag associated with an intermediate directory has been encountered and that the intermediate directory does not contain a next node along the access path; and based at least in part on the response, instruct a component external to the intermediate directory to be involved with accessing the file or the directory.

Example Clause B, the system of Example Clause A, wherein the component external to the intermediate directory comprises another directory in a different file system.

Example Clause C, the system of Example Clause A, wherein the component external to the intermediate directory comprises another directory in a same file system.

Example Clause D, the system of any one of Example Clauses A through C, wherein the reparse tag comprises metadata that identifies the file system filter and that causes the file system filter to redirect access to the file or the directory from the intermediate directory to a target directory that is different than the intermediate directory.

Example Clause E, the system of any one of Example Clauses A through D, wherein the file system filter is further executable by the one or more processors to: create the reparse tag; and associate the reparse tag with the intermediate directory to enable partial expansion of content contained in the intermediate directory.

Example Clause F, the system of any one of Example Clauses A through E, wherein the access path comprises the intermediate directory.

While Example Clauses A through F are described above with respect to a system, it is also understood in the context of the document that the subject matter of Example Clauses A through F can be implemented with respect to a method, computer-readable storage media, and/or a device.

Example Clause G, a system comprising: one or more processors; memory; a storage unit including a file system that provides access to one or more files or directories; and a file system filter stored in the memory and executable by the one or more processors to: receive a request to access a file or a directory associated with the file system, the request designating an access path for the file or the directory, the access path including multiple nodes; pass the request to access the file or the directory to the file system; receive a response from the file system, the response indicating that a reparse tag associated with an intermediate directory has been encountered and that the intermediate directory contains a next node along the access path; and based at least in part on the response, access the next node via the intermediate directory without implementing reparse behavior based on the reparse tag.

Example Clause H, the system of Example Clause G, wherein the reparse tag comprises metadata that identifies the file system filter and that causes the file system filter to redirect access to the next node in an event the intermediate directory does not contain the next node.

Example Clause I, the system of Example Clause G or Example Clause H, wherein the file system filter is further executable by the one or more processors to: create the reparse tag; and associate the reparse tag with the intermediate directory to enable partial expansion of content contained in the intermediate directory.

Example Clause J, the system of any one of Example Clauses G through I, wherein the access path comprises the intermediate directory.

While Example Clauses G through J are described above with respect to a system, it is also understood in the context of the document that the subject matter of Example Clauses G through J can be implemented with respect to a method, computer-readable storage media, and/or a device.

Example Clause K, a method comprising: receiving a request to access a file or a directory via the file system, the request designating an access path for the file or the directory, the access path including multiple nodes; determining, while attempting to access the file or the directory via the file system, that an intermediate directory is associated with a reparse tag; determining, by one or more processors, whether a next node along the access path exists in the intermediate directory; and deciding whether to implement reparse behavior based at least in part on determining whether the next node exists in the intermediate directory.

Example Clause L, the method of Example Clause K, wherein determining whether the next node exists in the intermediate directory comprises looking into the intermediate directory after encountering the reparse tag associated with the intermediate directory.

Example Clause M, the method of Example Clause K or Example Clause L, further comprising: determining that the next node does not exist in the intermediate directory; and determining, based at least in part on the reparse tag, a default action that instructs the file system to redirect access to the next node from the intermediate directory to a target directory that is different than the intermediate directory.

Example Clause N, the method of Example Clause M, wherein the target directory is contained in a different file system.

Example Clause O, the method of Example Clause K or Example Clause L, further comprising: determining that the next node does exist in the intermediate directory; and determining a default action that instructs the file system to access the next node from the intermediate directory without implementing reparse behavior based on the reparse tag.

Example Clause P, the method of Example Clause K or Example Clause L, further comprising: determining that the next node does exist in the intermediate directory; and determining, based at least in part on the reparse tag, a default action that instructs the file system to redirect access to the next node from the intermediate directory to a target directory that is different than the intermediate directory even though the next node does exist in the intermediate directory.

Example Clause Q, the method of Example Clause P, wherein the default action is based at least in part on a type of the reparse tag.

Example Clause R, the method of Example Clause K or Example Clause L, wherein the reparse tag comprises metadata that identifies a file system filter and that causes the file system filter to redirect access to the next node from the intermediate directory to a target directory that is different than the intermediate directory based on a determination that the next node does not exist in the intermediate directory.

Example Clause S, the method of any one of Example Clause K through Example Clause R, further comprising: creating the reparse tag; and associating the reparse tag with the intermediate directory to enable partial expansion of content contained in the intermediate directory.

Example Clause T, the method of any one of Example Clause K through Example Clause S, wherein the access path comprises the intermediate directory.

While Example Clauses K through T are described above with respect to a method, it is also understood in the context of the document that the subject matter of Example Clauses K through T can be implemented with respect to a system, computer-readable storage media, and/or a device.

CONCLUSION

Although the present disclosure may use language that is specific to structural features and/or methodological acts, the invention is not limited to the specific features or acts described herein. Rather, the specific features and acts are disclosed as illustrative forms of implementing the invention.

What is claimed is:
1. A system comprising:
   one or more processors;
   memory;
   a storage unit including a file system that provides access to one or more files or directories; and
   a file system filter stored in the memory and executable by the one or more processors to:
      receive a request to access a file or a directory associated with the file system, the request designating an access path for the file or the directory, the access path including multiple nodes;
      pass the request to access the file or the directory to the file system;
      receive a response from the file system, the response indicating that a reparse tag associated with an intermediate directory has been encountered and that the intermediate directory contains a next node along the access path; and
      based at least in part on the response, access the next node via the intermediate directory without implementing reparse behavior based on the reparse tag.
2. The system of claim 1, wherein the reparse tag comprises metadata that identifies the file system filter and that causes the file system filter to redirect access to the next node in an event the intermediate directory does not contain the next node.
3. The system of claim 1, wherein the file system filter is further executable by the one or more processors to:
   create the reparse tag; and associate the reparse tag with the intermediate directory to enable partial expansion of content contained in the intermediate directory.

4. The system of claim 1, wherein the access path comprises the intermediate directory.

5. A method comprising:
receiving a request to access a file or a directory via the file system, the request designating an access path for the file or the directory, the access path including multiple nodes;
determining, while attempting to access the file or the directory via the file system, that an intermediate directory is associated with a reparse tag;
determining, by one or more processors, whether a next node along the access path exists in the intermediate directory; and
deciding whether to implement reparse behavior based at least in part on determining whether the next node exists in the intermediate directory.

6. The method of claim 5, wherein determining whether the next node exists in the intermediate directory comprises looking into the intermediate directory after encountering the reparse tag associated with the intermediate directory.

7. The method of claim 5, further comprising:
determining that the next node does not exist in the intermediate directory; and
determining, based at least in part on the reparse tag, a default action that instructs the file system to redirect access to the next node from the intermediate directory to a target directory that is different than the intermediate directory.

8. The method of claim 7, wherein the target directory is contained in a different file system.

9. The method of claim 5, further comprising:
determining that the next node does exist in the intermediate directory; and
determining a default action that instructs the file system to access the next node from the intermediate directory without implementing reparse behavior based on the reparse tag.

10. The method of claim 5, further comprising:
determining that the next node does exist in the intermediate directory; and
determining, based at least in part on the reparse tag, a default action that instructs the file system to redirect access to the next node from the intermediate directory to a target directory that is different than the intermediate directory even though the next node does exist in the intermediate directory.

11. The method of claim 10, wherein the default action is based at least in part on a type of the reparse tag.

12. The method of claim 5, wherein the reparse tag comprises metadata that identifies a file system filter and that causes the file system filter to redirect access to the next node from the intermediate directory to a target directory that is different than the intermediate directory based on a determination that the next node does not exist in the intermediate directory.

13. The method of claim 5, further comprising:
creating the reparse tag; and
associating the reparse tag with the intermediate directory to enable partial expansion of content contained in the intermediate directory.

14. The method of claim 5, wherein the access path comprises the intermediate directory.

15. A system comprising:
one or more processors;
memory;
a storage unit including a file system that provides access to one or more files or directories; and
a file system filter stored in the memory and executable by the one or more processors to:
receive a request to access a file or a directory via the file system, the request designating an access path for the file or the directory, the access path including multiple nodes;
determine, while attempting to access the file or the directory via the file system, that an intermediate directory is associated with a reparse tag;
determine whether a next node along the access path exists in the intermediate directory; and
decide whether to implement reparse behavior based at least in part on determining whether the next node exists in the intermediate directory.

16. The system of claim 15, wherein determining whether the next node exists in the intermediate directory comprises looking into the intermediate directory after encountering the reparse tag associated with the intermediate directory.

17. The system of claim 15, wherein the file system filter is further executable by the one or more processors to:
determine that the next node does not exist in the intermediate directory; and
determine, based at least in part on the reparse tag, a default action that instructs the file system to redirect access to the next node from the intermediate directory to a target directory that is different than the intermediate directory, wherein the target directory is contained in a different file system.

18. The system of claim 15, wherein the file system filter is further executable by the one or more processors to:
determine that the next node does exist in the intermediate directory; and
determine a default action that instructs the file system to access the next node from the intermediate directory without implementing reparse behavior based on the reparse tag.

19. The system of claim 15, wherein the file system filter is further executable by the one or more processors to:
determine that the next node does exist in the intermediate directory; and
determine, based at least in part on the reparse tag, a default action that instructs the file system to redirect access to the next node from the intermediate directory to a target directory that is different than the intermediate directory even though the next node does exist in the intermediate directory, wherein the default action is based at least in part on a type of the reparse tag.

20. The system of claim 15, wherein the file system filter is further executable by the one or more processors to:
create the reparse tag; and
associate the reparse tag with the intermediate directory to enable partial expansion of content contained in the intermediate directory.

* * * * *